United States Patent [19]
Hyde-Smith

[11] Patent Number: 5,562,586
[45] Date of Patent: Oct. 8, 1996

[54] LANDFILL CAP AND METHOD OF SEALING LANDFILL

[75] Inventor: Peter K. Hyde-Smith, Mayville, Mich.

[73] Assignee: Foamseal, Inc., Oxford, Mich.

[21] Appl. No.: 261,820

[22] Filed: Jun. 17, 1994

[51] Int. Cl.⁶ ................................................ B09B 1/00
[52] U.S. Cl. .............................. 588/250; 405/129
[58] Field of Search .................. 405/128, 129, 405/270; 588/249, 250

[56] References Cited

U.S. PATENT DOCUMENTS

| | | | |
|---|---|---|---|
| 4,112,176 | 9/1978 | Bailey | 428/95 |
| 4,390,675 | 6/1983 | Gruber | 526/273 |
| 4,519,338 | 5/1985 | Kramer et al. | 405/129 X |
| 4,546,114 | 10/1985 | Alberino et al. | 521/51 |
| 4,844,840 | 7/1989 | Feizollahi | 405/129 X |
| 4,882,386 | 11/1989 | Stella | 525/133 |
| 4,882,411 | 11/1989 | Grogler et al. | 528/64 |
| 5,056,960 | 10/1991 | Marienfeld | 405/270 |
| 5,078,543 | 1/1992 | Terrel | 405/128 |
| 5,090,843 | 2/1992 | Grigsby | 405/129 |
| 5,137,393 | 8/1992 | Fuhr et al. | 405/129 |
| 5,206,067 | 4/1993 | Bonzo | 428/119 |
| 5,259,698 | 11/1993 | Garzon | 405/129 |

*Primary Examiner*—John A. Ricci
*Attorney, Agent, or Firm*—Howard & Howard

[57] ABSTRACT

A cap for sealing waste in a landfill is prepared by disposing a fill layer atop the waste and applying a fast-curing elastomeric material to the fill layer to provide a monolithic, continuous, elastomeric coating thereupon. The elastomeric material is derived from the reaction of an isocyanate-terminated compound having at least two reactive isocyanate groups and an amine-terminated compound having at least two reactive amine groups. The elastomeric layer is preferably covered with a porous drainage layer which is in turn covered with a layer of soil.

39 Claims, 1 Drawing Sheet

LANDFILL CAP AND METHOD OF SEALING LANDFILL

FIELD OF THE INVENTION

This invention relates generally to landfills of the type used for the disposal of solid wastes. More specifically, the invention relates to a cover or cap structure for sealing waste in a landfill. Most specifically the present invention relates to a landfill cap structure which includes a monolithic layer of an elastomeric material.

BACKGROUND OF THE INVENTION

The safe disposal of waste is an ever growing, worldwide concern; and landfill technology has been developed to provide for the safe and economical disposal of solid waste. A typical modern landfill comprises a waste-receiving pit excavated into the ground and lined with a moisture impervious material to isolate the waste from groundwater. The landfill generally includes a collection system for withdrawing liquid, commonly referred to as leachate, from the waste pit. The leachate is comprised of moisture which enters the pit as well as moisture generated within the waste itself. When full, the landfill pit is closed by a moisture impervious cap which is typically configured so as to drain water away from the pit. The cap is usually pierced by one or more vents which establish a passage for the flow of gases from the landfill. These gases comprise methane and other by-products of waste decomposition and they are typically burned or otherwise chemically neutralized.

The cap is an important part of the landfill since it serves to isolate the waste in the landfill from the exterior environment. The cap prevents the exit of pathogens, toxins and odors from the landfill and prevents access of vermin to the waste. The cap also serves a very important function in preventing access of water to the interior of the landfill; this is necessary to minimize the amount of leachate in the landfill and to preserve the integrity of the pit lining.

Prior art landfill caps typically comprise a layer of about two feet in thickness of a low hydraulic conductivity material such as clay or soil with a high clay content. A drainage layer of sand, gravel or other permeable material is disposed atop the low hydraulic conductivity layer and a layer of topsoil, planted with vegetation covers the structure. The cap is typically shaped so as to facilitate drainage of rainwater away from the landfill; in operation, rainwater and the like passing through the layer of soil and vegetation is stopped by the low hydraulic conductivity layer and flows away from the landfill through the permeable layer.

Problems have been encountered with prior an landfill cap structures as a result of cracking of the clay based layer. Cracking can result from settling of the layer as waste in the landfill compacts. Additionally, freezing and thawing soil can crack and heave the clay layer. Also, desiccation of the clay layer can produce cracks. Problems are also encountered at the points where gas vents and leachate pipes penetrate the layer since it is difficult to obtain a good seal thereabout, and the site of penetration can become a crack initiator. This problem is particularly severe when a new opening must be made through an established cap. In addition to the foregoing, fabrication of clay based caps can be difficult, since care must be taken to utilize soils having a proper moisture content if an impervious seal is to be obtained. Also, movement of equipment across the layer while it is being formed is likely to create cracks, particularly when weather conditions are very dry.

Because of these acknowledged problems with clay based capping layers, the prior art has, in some instances, further included polymeric sheets in landfill caps. These sheets are typically made of low density polyethylene or polyvinyl chloride and are used in combination with the clay based layer. Typically the polymeric sheet is placed atop the clay layer prior to placement of the drainage layer. While the polymeric sheet material improves the performance of the cap structure, new problems are encountered in its use. The polymeric material is easily punctured during installation, or by waste in the landfill or rocks, branches and the like encountered in the ambient environment. Additionally, the polymeric sheet is prone to tear as a result of strain caused by settling of the landfill or friction of the sheet against the clay based layer caused by the overburden of the drainage layer and vegetation layer, particularly at the highly sloped portions of the cap structure. The polymeric sheet does not solve the problems caused by feed throughs since it is not capable of effecting a tight seal to pipes, tubes and the like. Also, polymeric sheet material is fairly difficult to install over large surface areas, and care must be taken to insure that installation equipment does not puncture or tear the sheet. If smaller area sheets are utilized or the landfill is large, they must be joined together, and the formation of strong, moisture tight seams in large area polymerized sheet material is quite difficult to achieve and expensive.

In view of the foregoing, it will be appreciated that there is a need for a landfill cap structure which is capable of reliably sealing a landfill against entry of ambient moisture for relatively long periods of time. The cap structure should be stable to a wide range of environmental conditions and should be resistant to damage from freeze/thaw cycles, ground subsidence and the like. In addition, the cap structure should provide for a moisture tight seal to conduits, cables and other such elements which pass through the cap. Finally, the cap structure should be low in cost and easy to install.

As will be explained in greater detail hereinbelow, the present invention provides a landfill cap structure which includes a seamless, monolithic, conformal body of elastomeric material. The body of elastomeric material is preferably applied by a spray process and provides a moisture-tight seal to subjacent layers as well as to conduits, vents and the like which pass therethrough. The elastomeric layer of the present invention is stable to the ambient atmosphere as well as to the chemical environment of the landfill. These and other advantages of the present invention will be readily apparent from the drawings, discussion and description which follow.

BRIEF DESCRIPTION OF THE INVENTION

There is disclosed herein a method for sealing waste in the landfill. The method comprises the steps of:

disposing a fill layer atop a body of waste retained in the landfill; and applying a fast-curing elastomeric material to the fill layer so as to provide a monolithic, continuous, elastomeric coating thereupon. The fast curing elastomeric material is preferably prepared by rapidly mixing, and initiating the reaction of, an isocyanate-terminated compound having at least two reactive isocyanate groups with a compound including at least two active hydrogens. Such compounds will include, by way of illustration and not limitation, amines, alcohols, thiols, reaction products of epoxides, organic acids and the like. The isocyanate compounds also react with Lewis acids and other electron acceptors.

One preferred group of reactive compounds include amine-terminated compounds having at least two reactive amine groups, or compounds including at least two reactive hydroxyl groups. The most preferred elastomeric material is prepared by reacting the isocyanate with the amine-terminated compound. The method includes the further step of allowing the fast-curing elastomeric material to cure so as to provide the coating on the fill layer. In a final step, the elastomeric coating is covered with soil. In one particular embodiment, the fill layer includes a porous membrane such as a layer of woven or non-woven fabric or a porous, paper based layer. The fill layer may also include a layer of low hydraulic conductivity soil, and in one particular embodiment, the fill layer comprises a layer of low hydraulic conductivity soil having a porous membrane supported thereupon; and in this embodiment, the coating material is applied to the porous membrane. In further embodiments of the invention, a drainage layer is disposed atop the elastomeric coating and the drainage layer is covered with the soil.

It is generally preferred that the fast-curing elastomeric material is applied by spraying. The isocyanate-terminated compound may be a monomeric or polymeric methylene diphenyl diisocyanate or a mixture of monomeric or polymeric methylene diphenyl diisocyanates of the general formula:

where n is an integer from about 0 to about 10.

In another embodiment, the isocyanate-terminated compound is a quasi-prepolymer or a mixture of quasi-prepolymers of the general formula:

or of the general formula:

where m is equal to 2 or 3, R' is hydrogen or an aliphatic radical and R is an aliphatic polyether.

The amine-terminated compound may, in some instances, comprise a material of the general formula:

where each R" is hydrogen or methyl and the average value of x is in the range of 2–105. In another instance, the amine-terminated compound may comprise a polymeric material of the general formula:

$$CH_2 + OCH_2CHR")_a - NH_2$$
$$CH + OCH_2CHR")_b - NH_2$$
$$CH_2 + OCH_2CHR")_c - NH_2$$

where R" is hydrogen or methyl and a, b and c are independently in the range of about 0 to about 100.

The present invention also includes a landfill cap manufactured by the foregoing method.

DETAILED DESCRIPTION OF THE INVENTION

The present invention relates to a landfill cap which includes a monolithic, moisture impervious layer of flexible, elastomeric material. The elastomeric layer seals the landfill and prevents the entry of moisture thereinto. The elastomeric layer also provides a flexible, moisture tight seal to conduits, vent pipes and other such structures which penetrate into the landfill. The elastomeric layer is prepared by reacting an isocyanate-terminated compound or polymer containing at least two reactive isocyante groups with either an amine compound or polymer containing at least two reactive amine groups, or a compound or polymer including at least two reactive hydroxyl groups. The layer is preferably applied by spraying.

Figure 1:
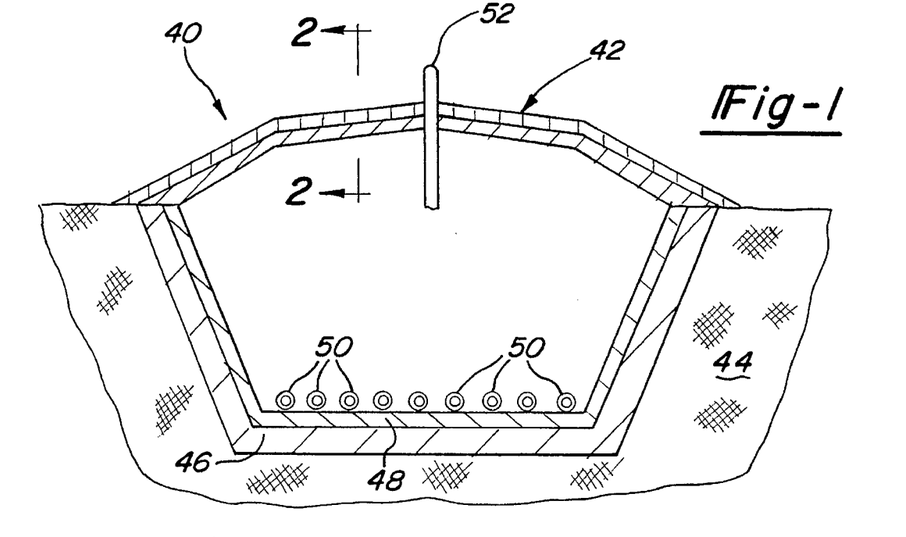
FIG. 1 is a cross-sectional view of a landfill which includes the cap structure of the present invention.

FIG. 1 is a schematic, cross-sectional view of a landfill 40 which includes the cap 42 of the present invention. The landfill 40 comprises a pit excavated into the earth 44. The pit is preferably removed from the water table of the soil and is lined with a low hydraulic conductivity material 46. In the context of the present disclosure, a low hydraulic conductivity material comprises any material which does not readily permit passage of moisture therethrough. Most typically, the low hydraulic conductivity materials utilized in the present invention will comprise clay, or soils having a very high clay content. In the illustrated embodiment, the pit also includes a liner 48 fabricated from a moisture impervious material such as a sheet of polyethylene or polyvinyl chloride. It is to be understood that the thickness of the liner 48 has been exaggerated for purposes of illustration. Typically, the layer of low hydraulic conductivity material 46 will be on the order of several feet, whereas the liner 48 will be typically in the range of 40–100 mills.

The landfill structure 40 further includes a leachate collection system comprised of a series of permeable pipes 50 disposed at the bottom of the pit. The pipes 50 collect liquids which accumulate at the bottom of the pit and permit them to be withdrawn for treatment and further disposal through a series of conduits, not illustrated. The landfill 40 further includes a vent pipe 52 which passes through the cap 42. The vent pipe 52 permits withdrawal of gasses generated within the landfill. The gasses primarily comprise methane generated by decomposition of the waste, and if not vented, could cause rupture of the cap and/or liner. The gasses are burned, or otherwise chemically neutralized.

It will be appreciated that as a result of subsidence of the waste, gas pressure and freezing and thawing of the earth, the cap 42 is subject to stresses and strains. These stresses can be concentrated at the point where the vent 52 passes therethrough; and as described above, such stresses can crack caps of the prior art.

Figure 2:
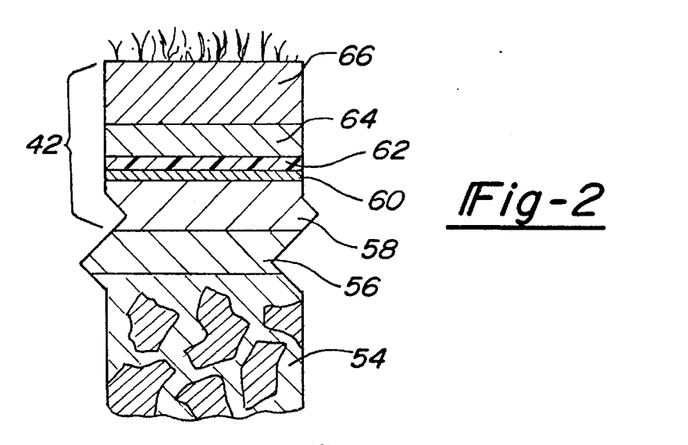
FIG. 2 is a cross-sectional view of the landfill of FIG. 1 better illustrating the cap of the present invention.

Referring now to FIG. 2, there is shown a cross-sectional view of the cap 42 of FIG. 1, taken along line 2—2. As illustrated, the cap 42 is disposed atop, and seals a body of waste 54 contained in the landfill. Disposed between the layer of waste 54 and the cap 42 is a pre-fill layer 56. This layer is optional, but is typically included prior to closing of the landfill to provide a smooth base for the application of the capping layers. The pre-fill layer 56 may comprise a layer of soil, sand, gravel, rubble or small particulate sized waste.

The cap 42 includes a fill layer 58 which typically comprises a layer of low hydraulic conductivity soil. The fill layer 58 generally ranges from one to four feet in thickness. In general, it has been found that when the elastomeric layer of the present invention is included, one foot of low hydraulic conductivity soil suffices. The fill layer preferably also includes a porous sheet or membrane 60 thereatop.

While the elastomeric material may be applied directly to the layer of low hydraulic conductivity soil 58, it has been found that the porous membrane 60 provides a base for the application of the elastomeric material and minimizes the amount of material required to form a contiguous, moisture impervious layer. The porous membrane 60 may comprise a fabric such as burlap, fiberglass or other open weave cloth. The porous membrane may also comprise a perforated polymeric structure, or a paper based material. One particularly preferred material comprises non-woven polypropylene fabric having a thickness of approximately 26 mils and a weight of 2.3 ounces per square yard.

In accord with the present invention, a layer of elastomeric material 62 is applied to the fall layer. This elastomeric material, which will be described in greater detail hereinbelow, provides a relatively flexible moisture barrier which seals the landfill. The elastomeric material 62 is preferably applied by spray coating thereby eliminating the need to unroll and position large polymeric sheets, and the need to form the seams between adjacent sheets.

In the illustrated embodiment, a drainage layer 64 is disposed immediately atop the layer of elastomeric material 62. The drainage layer 64 is comprised of a material having a high permeability to water such as sand, gravel, rocks, crushed slag, broken concrete or the like. The drainage layer 64 provides a horizontal flow path through the cap which conveys rain water away from the landfill. The drainage layer 64 is typically one foot thick. Immediately atop the drainage layer is a final layer of soil 66 which is usually planted with vegetation. The soil layer is typically at least two feet thick and provide an environmentally acceptable appearance to the landfill. The vegetation and soil serve to slow the passage of water through to the remainder of the landfill cap.

The elastomeric material of the present invention is preferably applied to the fill layer by spraying and comprises a layer of approximately 20–200 mils in thickness and more preferably a thickness of at least 40 mils. There is no upper limit on thickness, except as dictated by economy of the process. Most preferably, the material is applied at a thickness of approximately 40–60 mils. In those instances where the elastomeric material is applied directly to the soil of a fill layer, thicker applications may be needed to provide complete coverage. If a porous membrane is employed, the membrane will provide a smooth base for application, and relatively thinner layers may be utilized.

In accord with one preferred embodiment of the present invention, a membrane having a color different from that of the elastomeric material is utilized. In this manner, complete coverage of the membrane may be verified by noting the masking of the membrane color by the applied elastomer. If a highly colored membrane having a high degree of "show-through" is employed, a relatively thicker layer of elastomer will be required to mask its presence. In those instances where the membrane has a less intense color, a thinner coating of elastomer will suffice to mask its presence. Therefore, it will be seen that through the use of a colored membrane, the completeness of coverage as well as the thickness of the coating may be verified.

Figure 3:
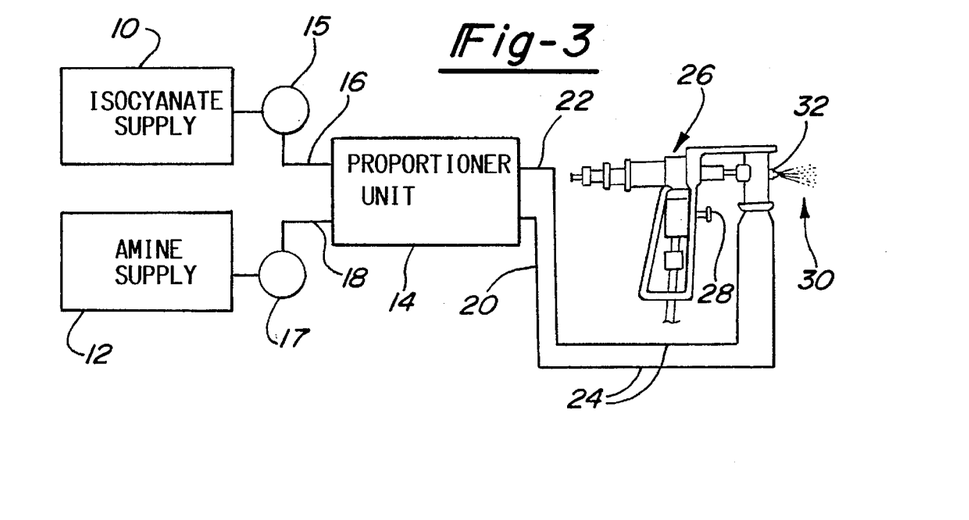
FIG. 3 is a schematic depiction of a spray gun which may be employed in the fabrication of the landfill cap of the present invention.

The elastomeric material of the present invention is prepared by reacting an isocyanate-terminated compound or polymer containing at least two reactive isocyanate groups with an amine compound or polymer containing at least two reactive amine groups. The two reactive components are mixed immediately before being spray applied to the surface to be coated. FIG. 3 is a schematic representation of an apparatus suitable for applying the elastomeric coating of the present invention. A source of the isocyanate-terminated compound 10 and a source of the amine-containing compound 12 are separately connected to a control unit 14 by lines 16 and 18, respectively. Pumps 15 and 17 are located in lines 16 and 18, respectively, to transfer the liquid reactants to the control unit 14. The control unit 14 allows precise and accurate control of the relative amounts, temperatures, and pressures of two reactants fed to the spray gun 26. The isocyanate-terminated compound from source 10 is fed through line 16 by pump 15 into control unit 14 and then through line 22 to spray gun 26. The amine-containing compound is similarly fed from source 12 through line 18 by pump 17 into control unit 14 and then through line 20 to spray gun 26. Preferably, lines 20 and 22 are physically connected or bundled (i.e., bundled line 24) at some point after exiting from the control unit 14 to minimize tangling of the separate lines. The bundled line 24 is connected directly to the spray gun 26 which is equipped with a trigger 28 to activate the spraying action and a nozzle 32. The sprayed fast-curing elastomeric material 30 is applied directly to the surface to be coated.

Because of the very reactive components used and the fast-curing nature of the elastomeric material formed from the reactive components, the reactive components are preferably mixed directly in the spray gun 26, in an impingement mixing chamber (not shown). Suitable spray guns are commercially available. One especially preferred spray gun is a Model GX7 spray gun from Gusmer of Lakewood, N.J. The control unit 14 is also commercially available. Especially preferred control units include the H-2000 proportioner unit from Gusmer and the FS2000 proportioner unit from Foamseal of Oxford, Mich. These units can typically supply and deliver about 10 to 30 pounds of material per minute at a pressure of about 1000 to 3500 psi. Generally, an output rate of about 15 to 25 pounds/minute at about 1200 to 2500 psi is preferred. Both of these proportioners include pumps and temperature and pressure controls for accurate metering and control of the raw materials to the spray gun. Pumps 15 and 17 used to transfer reactants to the control unit 14 are also commercially available. Preferred pumps 15 and 17 include air-driven 2:1 transfer pumps from Gusmer. Preferably, reactant supplies, transfer pumps, and the control unit are located on a mobile trailer or truck bed (not shown) to allow easy movement across the surface of the landfill.

Although the elastomeric materials of this invention can be applied year round, better results are generally obtained at ambient temperatures of about 0° to 150° F. Largely for convenience, ambient temperatures of 65° F. or higher are preferred. Generally, substrate temperatures of up to 200° F. are acceptable. Typically, substrates temperature are normally in the range of about 55° to 75° F. depending on the season. The temperature of the isocyanate-containing and amine-containing reactants are generally in the range of about 100° to about 200° F. and are preferably in the range of about 130° to 180° F. and are more preferably in the range of about 150° to 160° F. At lower ambient or substrate temperatures, it may be preferred to employ the reactants at a temperature at the higher end of the range. Although it is generally preferred that the two reactants be at roughly the same temperature when mixed and reacted, it is not necessary. And although it is generally preferred that the relative amounts of the two reactants are essentially 1 to 1 (by either volume or weight, depending on whether the actual control units use volume or weight control parameters), it is not necessary. The relative ratio of 1 to 1 for the reactants allows for easier adjustment and control of the process. However, other relative ratios can be used so long as the resultant elastomeric material has the necessary properties.

The elastomeric material of the present invention is prepared by mixing and reacting an isocyanate-terminated compound or polymer with an amine-terminated polymer or compound or, hydroxyl-terminated polymer or compound, or most preferably an aliphatic or aromatic diamine compound and then essentially immediately applying the resultant reacting mixture to the surface to be coated and repaired. Preferably, the mixing of the two reactants is effected directly within the spray gun used to apply the mixture (i.e., impingement mixing).

Suitable isocyanate-terminated compounds or polymers must have at least two terminal isocyanate groups and may be either aliphatic or aromatic in nature. The isocyanate-terminated compounds suitable for use in this invention have mean functionality of about 2 to 3.2 and contain about 15 to 35 weight percent isocyanate groups. Preferred isocyanate-terminated compounds are based on, or derived from, methylene diphenyl diisocyanate (MDI). Preferred isocyanate-terminated compounds are of the monomers or polymers of the general formula I where n is an integer from 0 to about 10 and preferably from 0 to about 4. The isocyanate-terminated compound I is methylene diphenyl diisocyanate when n is zero and is a polymeric methylene diphenyl diisocyanate when n is greater than zero. Mixtures of the compounds I can also be used. In fact, a mixture containing compound I where n equals 0, is one preferred isocyanate-terminated compound. Preferably compound I is, when n equals 0, a mixture of the 4,4'-methylenediphenyl diisocyanate and the 2,4'-methylene diphenyl diisocyanate isomers. Often, this mixture will contain a small amount of the 2,2'-isomer (i.e., 2,2'-methylene diphenyl diisocyanate). Compound I with n greater than or equal to 1 is a linear polymer. As those skilled in the art will realize, branched polymers can also be used where methylene phenyl isocyanate group are attached directly to one or both of the phenyl rings in the methylene diphenyl diisocyanate structure. Mixtures of such linear and branched polymers can also be used. Other preferred isocyanate-terminated compounds are quasi-prepolymers of the general formulas II and III:

FORMULA II

FORMULA III where m is equal to 2 or 3, R' is a hydrogen or an aliphatic radical (e.g., methyl or ethyl radical), and R represents an aliphatic polyether. The polymer II is an isocyanate-terminated quasi-prepolymer prepared by reacting a polymer as defined in formula I with a dihydroxyl-terminated or a trihydroxyl-terminated polyol. The polymer III is an isocyanate-terminated quasi-prepolymer prepared by reacting a polymer as defined in formula I with a diamine-terminated or a triamine-terminated polyether. Generally, quasi-prepolymers of general formula II are preferred. Especially preferred polyols are the aliphatic polyether polyols. For example, reacting a hydroxyl-terminated polyether (HO–OH) with methylene diphenyl diisocyanate yields a isocyanate-terminated prepolymer as illustrated in the following equation:

where ~ represents the aliphatic polyether portion. Similarly, a polyether diamine could be reacted with methylene diphenyl diisocyanate. Examples of such aliphatic polyether groups include the following:

-continued $-CH_2CH_2CH_2CH_2+OCH_2CH_2CH_2CH_2+OCH_2CH_2CH_2CH_2-$ and the like, where each R" is independently a hydrogen or a methyl radical. Thus, these polyether compounds are based on the polymerization of ethylene oxides, propylene oxides, butylene oxides, and the like. Preferably, x has an average value such that the molecular weight of the polyol portion is in the range of about 500 to 6000, and more preferably in the range of about 500 to 2500.

The quasi-prepolymers are prepared by reacting an excess of methylene diphenyl diiocyanate with a polyether polyol (terminated with either two or three hydroxyl groups) or the polyether amine (terminated with either two or three reactive amine groups, preferably primary amine groups) to obtain a liquid quasi-prepolymer. Generally an equivalent ratio for the reactants (as expressed in terms of —NCO to —OH or —NCO to —NH) of about 2 to 1 or greater, respectively, is acceptable although the equivalent ratio of the reactants and the reaction conditions can be varied so long as the resultant quasi-prepolymer remains liquid at, or slightly above, room temperature. The quasi-prepolymers must contain sufficient free isocyanate groups to react with amine-terminated compounds when the actual elastomeric material is applied to the surface of the fill layer. As the equivalent ratio of the reactants approaches about 1 to 1, solid quasi-prepolymers may result; such solid quasi-prepolymers would not be useful in the practice of this invention and should, therefore, be avoided. Two general methods have been found useful in the preparation of the quasi-prepolymers. In the first, the reactants are simply mixed together and reacted at a temperature from about room temperature to 140° F. for a time sufficient to prepare the desired quasi-prepolymer. The time required will, of course, depend on the reaction temperature; generally an overnight reaction time will be sufficient. This first method is especially adapted for use in the present invention in that the reactants can simply be combined in a suitable container (e.g., a 55 gallon drum), heated if necessary, and the quasi-prepolymer will be ready to use the next morning. The quasi-prepolymers can also be prepared in a more controlled manner by adding the polyether polyol or the polyether amine slowly to the diisocyanate at the reaction temperature (room temperature to about 140° F.) so as to insure a large excess of the diisocyanate during the reaction. Using either method, solvent is not required. In some cases, cooling of the reactants may be desirable in order to control the exotherm. Generally, such cooling is not needed at the lower reaction temperatures.

Isocyanate-terminated polymers suitable for use in the present invention are generally available commercially. Examples of such commercially available materials include isocyanates such as PAPI94 from Dow Chemical Company, MRS Series isocyanates from Miles Inc., Mondur ML from Miles, Inc.; uretonimine modified methylene diphenyl diisocyanates such as Mondur CD from Miles, Inc., Isonate 143L from Dow Chemical Company and LF-168 from ICI Polyurethanes; quasi-prepolymers prepared from methylene diphenyl diisocyanates such as Mondur PF from Miles, Inc., Isonate 181 from Dow Chemical Company, and LF-179 from ICI Americas, Inc.. Other commercially available isocyanate-terminated polymers may also be used. Examples of polyether polyols useful in preparing quasi-prepolymers of the present invention include PolyG 20-56, PolyG 30-28, PolyG 85-36, PolyG 85-29, PolyG 76-120, PolyG 55-28, and PolyG 55-56 from Olin Corporation. Especially preferred polyether polyols are the polypropylene oxide polyetherdiols and ethylene oxide-capped polyether triols. Similar polyether polyols from other suppliers may also be used to prepare the quasi-prepolymers.

As noted above, the elastomeric material of the present invention is prepared by mixing and reacting an isocyanate-terminated compound with an amine compound containing at least two reactive amine groups wherein the mixing and reacting occurs immediately before the application to the surface to be repaired. The amine compound can be aliphatic or aromatic. The reactive amine can be a primary or a secondary amine. The amine-terminated compounds suitable for use in this invention generally have a mean functionality of about 2.0 to 3.0 and an average molecular weight of about 150 to 6000. Preferred amine compounds include amine-terminated polymers and aliphatic or aromatic diamines. Preferred amine-terminated polymers are the polyoxyalkyleneamines having primary amino groups attached to the terminus of polyether backbones (i.e., polyether amines). Examples of preferred aliphatic amine-terminated polymers include polymers of general formula IV $$H_2N-CH_2CH+OCH_2CH\overset{|}{\underset{R"}{}}_x OCH_2CH-NH_2 \quad \text{FORMULA IV}$$
$$\overset{|}{R"} \qquad \overset{|}{R"}$$

where each R" is independently hydrogen or a methyl radical. Preferably, R" is a methyl radical and the average value of x is in the range of about 2 to 105 which corresponds to an average molecular weight of about 230 to 6000. An example of such an aliphatic amine-terminated polymer is the Jeffamine D-2000 amine-terminated polypropylene glycol from Texaco Chemical Co. where in the above formula IV, R" is a methyl group, x has an average value of about 33, and the molecular weight is about 2000.

Triamine polymers can also be used. Examples of preferred aliphatic triamine-terminated polymers include polymers of general formula V $$\begin{array}{l} CH_2+OCH_2CHR")_a-NH_2 \\ | \\ CH+OCH_2CHR")_b-NH_2 \\ | \\ CH_2+OCH_2CHR")_c-NH_2 \end{array} \quad \text{FORMULA V}$$

where R" is hydrogen or a methyl radical. Preferably R" is a methyl radical and a, b, and c are independently in the range of about 0 to about 100 and such that the average molecular weight is in the range of from about 260 to about 6000. Specific example of such triamine-terminated polymers include Jeffamine T-3000 (average molecular weigh of 3000 and containing about 50 moles of polypropylene oxide) and Jeffamine T-5000 (average molecular weight of about 5000 and containing about 85 moles of polypropylene oxide) from Texaco Chemical Company.

Examples of suitable aliphatic amines include bis(para-aminocyclohexyl)methane and mixed polycycloaliphatic amines (both commercially available from Air Products and Chemicals, Inc.). Examples of suitable aromatic amines include 3,5-diethyltoluene-2,4-diamine, 3,5-diethyltoluene-2,6-diamine, and mixtures thereof (commercially available as Ethacure 100 from Ethyl Corporation); para-di(N-alkyl)amine benzene (commercially available as Unilink 4100 from UOP); and 4,4'-methylene diphenyl di(N-alkyl)amine (commercially available as Llnilink 4200 from UOP), as well as Unilink 8100, and Unilink 8130 from UOP. Oligomeric diamines (i.e., polytetramethyleneoxide di-p-aminobenzoate) such as Polamine-650, Polamine- 1000, and Polamine-2000 from Air Products and Chemicals, Inc. can also be used.

Of course, mixtures of suitable isocyanate-terminated compounds and mixtures of suitable amine-terminated compounds can be used and are often preferred. Generally equivalent amounts (i.e., 1 to 1 ratios based on the reactive isocyanate and amine contents) of the isocyanate material and the amine material are mixed directly in the spray gun and the resultant reacting mixture is applied to the fill layer. Various additives can be included in the isocyanate reactants and/or the amine reactants. For example, organic or inorganic colorants can be added to either reactants. By using colored dyes or colorants, the effectiveness of the mixing in the spray gun as well as the aforementioned application parameters can be determined visually: an elastomeric material of uniform color will generally indicate acceptable mixing and proper operation of the spray equipment. Examples of suitable dyes or colorants include 57AB Black, X17AB Blue, X38 Orange, X52 Red, and X15 Yellow from Milliken Chemical. Other commercially available dyes or colorants can be used so long as they are compatible with the reactants and other components. It is preferred that the isocyanate-terminated compounds and mixtures of suitable amine-terminated compounds are chosen to enable effective use of chosen colorants. That is, the unpigmented elastomeric material should preferably be extremely light in color once cured.

Other additives, including light stabilizers, UV absorbers, anti-oxidants, and other processing aids or enhancers, are also preferably employed. Generally it is preferred to incorporate such additional components into the amine reactants. Examples of suitable light stabilizers include hindered amines such as Tinuvin 765 (bis (1,2,2,6,6-pentamethyl-4-piperidinyl) sebacate) and Tinuvin 770 (bis (2,2,6,6-tetramenthyl-4-piperidyl) sebacate) from Ciba-Geigy. Examples of suitable UV light absorbers include Tinuvin 328 and Tinuvin 571 from Ciba-Geigy (both are substituted benzotraiazoles). Examples of suitable antioxidants and thermal stabilizers include Irganox 259 (hexamethylene bis (3,5-di-tert-butyl-4-hydroxyhydro cinnamate), Irganox 1010 (tetrakis [methylene (3,5-di-tert-butyl-4-hydoxyhydro cinnamate)]methane), and Irganox 1330 (1,3,5-trimethyl-2,3,6-tris (3,5-di-tert-butyl-4-hydroxybenzyl) benzene) from Ciba-Geigy. Light stabilizers, if used, will normally be present at about 0.2 to 0.75 weight percent in the amine reactants. UV light absorbers, if used, will normally be present at about 0.2 to 0.75 weight percent in the amine reactants. Antioxidants or thermal stabilizers, if used, will normally be present at about 0.1 to 0.5 weight percent in the amine reactants. Other conventional light stabilizers, UV light absorbers, antioxidants and thermal stabilizers can also be used in place of, or in addition to, the specific examples given.

The following examples are intended to further illustrate the invention and not to limit the invention. Unless specified otherwise, all percentages in the following examples are by weight.

EXAMPLE ONE

A landfill cap was prepared in accord with the present invention by applying an elastomeric coating to a 2.3 ounce per square yard, non-woven, needle-punched polypropylene textile from Spartan Technologies, Inc. The textile was disposed upon a clay layer covering a landfill. The isocynate reactant consisted of a quasi-prepolymer, prepared by a reacting isocynate (Mondur ML from Miles, Inc.) with dihydroxyl-terminated propylene oxide based polyether with a molecular weight of about 2,000 (PolyG 20-56 from Olin Chemical). The isocyanate and polyether (50:50 weight ratio) were mixed together and allowed to react at 140° F. for about 16 hours. The amine reactant consisted of a polymeric aliphatic diamine (68.9% Jeffamine D-2000 from Texaco Chemical), an aromatic diamine (23.0% Ethacure 100 from Ethyl Corporation), a polymeric aromatic diamine (7.0% Polamine 650 from Air Products & Chemicals), a sterically hindered phenolic antioxidant (0.22 % Irganox® 1010 from Ciba-Geigy); a benzotriazole ultraviolet light absorber (0.44 % Tinuvin® 328 from Ciba-Geigy) and a hindered amine light stabilizer (0.44% Tinuvin® 292 from Ciba-Geigy). The mixture was applied from a spray apparatus generally similar to that of FIG. 3. The temperature of the reactants was about 155° F. as sprayed and layer thickness was approximately 40–60 mils.

One section of the cured elastomer was left uncovered, while another portion was covered with two feet of soil. Samples of the exposed and non-exposed elastomeric coated polypropylene fabric were taken at various periods of time and the tensile properties thereof measured in accord with ASTM method D638. Ten samples were taken at each time period of the covered and uncovered material and the maximum stress and elongation at break were measured. It was found that for the as prepared material the maximum stress (PSI) was 1506.7 and the elongation at break 261.8%. After one month, the covered material had a maximum stress of 1127.5 and an elongation at break of 311.9; while the exposed material had a maximum stress of 1000.0 and an elongation at break of 124.8%. After three months, the covered material had a maximum stress of 926.8 and an elongation at break of 105.4 %; and the exposed material had a maximum stress of 960.9 and an elongation at break of 153.9%. After six months, the covered material had a maximum stress of 1316.8 and an elongation at break of 24 1.1%, while the exposed material had a maximum stress of 1142.7 and an elongation at break of 193.6%.

EXAMPLE TWO

In those instances where the elastomeric material will not be exposed to ultraviolet radiation (i.e., direct sunlight), the ultraviolet absorber and stabilizers may be eliminated from the formulation. Applications of this type will arise when the elastomeric layer is covered with soil within several weeks of being coated.

A formulation generally similar to that of Example One was prepared from the quasi-prepolymer of Example One with 70.0% of the Jeffamine D-2000, 23 % of Ethacure 100 and 7.0% of Polamine 650.

This material was sprayed into test sheets and tested as detailed above. It was noted that the maximum stress was 2386.0 psi and the elongation at break was 497.7% for the freshly cured material. After one month of UV exposure in accord with ASTM D4329, the maximum stress was 2430.7 psi and the elongation at break was 433.9%. After 6 months of UV exposure, the maximum stress was 2144.2 psi and the elongation at break was 348.9%.

As will be understood by those skilled in the art, the present invention may be practiced with materials and methods other than those illustrated herein. For example, the elastomeric material may be extruded onto a porous membrane as it is unrolled, or immediately after it is unrolled, as an alternative to spray coating; however, spray coating is preferred for the reasons stated above. Also, as was detailed hereinabove, the membrane is an optional member, and the elastomeric material may be applied directly to the clay layer. In some instances, a number of separate layers of elastomer may be sprayed or otherwise applied to the fill layer to build up an elastomeric layer. Also, the technology of the present invention may be readily adapted to lining the landfill pit. In this embodiment of the invention, the elastomeric material is sprayed onto the interior of the clay-lined pit, either with or without the use of any additional membrane.

Thus, it will be appreciated that the foregoing drawings, discussion and description are merely meant to be illustrative of particular embodiments of the present invention and are not meant to be limitations upon the practice thereof. It is the following claims, including all equivalents, which define the scope of the invention.

I claim:

1. A method for sealing waste in a landfill comprising the steps of:
   disposing a low hydraulic conductivity fill layer atop a body of waste retained in said landfill;
   disposing a porous membrane atop the low hydraulic conductivity layer;
   applying a liquid, fast-curing elastomeric material to said porous membrane, wherein the fast-curing elastomeric material is prepared by rapidly mixing, and initiating the reaction of, an isocyanate-terminated compound having at least two reactive isocyanate groups and a compound including at least two active hydrogen immediately before applying the fast-curing elastomeric material to the porous membrane;
   allowing the fast-curing elastomeric material to cure, whereby a monolithic, continuous, elastomeric coating is formed on the porous membrane; and
   covering said elastomeric coating with soil.

2. A method as in claim 1, wherein the step of disposing a porous membrane comprises disposing a sheet of fabric.

3. A method as in claim 2, wherein the step of disposing a sheet of fabric comprises disposing a sheet of non-woven, polypropylene fabric.

4. A method as in claim 1, wherein the step of disposing a porous membrane comprises disposing a sheet of paper-based material.

5. A method as in claim 1, wherein the step of disposing a fill layer includes the step of disposing a layer of low hydraulic conductivity soil atop the body of waste.

6. A method as in claim 1, including the further step of applying a drainage layer atop the elastomeric coating.

7. A method as in claim 1, wherein the step of applying a fast-curing elastomeric material comprises spraying said material.

8. A method as in claim 1, wherein said porous membrane is of a color different from the color of the fast-curing elastomeric material and wherein the step of applying the fast-curing elastomeric material to the fill layer comprises applying said elastomeric material in an amount sufficient to completely mask the color of the porous membrane.

9. A method as in claim 1, wherein the step of initiating the reaction of the isocyanate-terminated compound comprises the step of initiating said reaction between said isocyanate-terminated compound and either an amine-terminated compound having at least two reactive amine groups or a compound including at least two reactive hydroxyl groups.

10. A method as in claim 1, wherein the step of initiating the reaction of the isocyanate-terminated compound comprises the step of initiating said reaction between said isocyanate-terminated compound and an amine-terminated compound having at least two reactive amine groups.

11. A method as in claim 10, wherein said isocyanate-terminated compound is a monomeric or a polymeric methylene diphenyl diisocyanate or a mixture of monomeric or polymeric methylene diphenyl diisocyanates of the general formula:

where n is an integer from about 0 to about 10.

12. A method as in claim 10, wherein the isocyanate-terminated compound is a quasi-prepolymer or a mixture of quasi-prepolymers of the general formula:

or of the general formula:

where m is equal to 2 or 3, R' is hydrogen or an aliphatic radical, and R is an aliphatic polyether.

13. A method as in claim 10, wherein the amine-terminated compound is of the general formula:

where each R" is independently hydrogen or a methyl radical and the average value of x is in the range of about 2–105.

14. A method as in claim 10, wherein the amine-terminated compound is of the general formula:

where R" is hydrogen or a methyl radical and a, b and c are independently in the range of about 0 to 100 and the average molecular weight of the compound is in the range of about 260–6,000.

15. A method as in claim 1, wherein the step of disposing a porous membrane comprises disposing a porous membrane which has been coated with said elastomeric material, wherein the step of applying said elastomeric material to said fill layer comprises applying said elastomeric material to at least a portion of said coated porous membrane.

16. A cap for sealing waste in a landfill, said cap comprising:
   a low hydraulic conductivity fill layer disposed atop a body of waste retained in said landfill;
   a porous membrane disposed atop said low hydraulic conductivity fill layer;
   an elastomeric coating disposed upon said porous membrane, said coating comprising the reaction product of an isocyanate-terminated compound having at least two reactive isocyanate groups and a compound including at least two active hydrogen; and a layer of soil covering said elastomeric coating.

17. A cap as in claim 16, wherein said porous membrane comprises a sheet of non-woven polypropylene fabric.

18. A cap as in claim 16, further including a drainage layer interposed between said elastomeric coating and said layer of soil.

19. A cap as in claim 16, wherein the reaction product of the isocyanate-terminated compound comprises the reaction product of said isocyanate-terminated compound and either an amine-terminated compound having at least two reactive amine groups or a compound including at least two reactive hydroxyl groups.

20. A cap as in claim 16, wherein the reaction product of the isocyanate-terminated compound comprises the reaction product of said isocyanate-terminated compound selected from the group consisting of monomeric and polymeric methylene diphenyl diisocyanates of the general formula:

monomeric and polymeric methylene diphenyl diisocyanates of the general formula:

where n is an integer from about 0 to about 10, and mixtures thereof, and quasi-prepolymers of the general formula:

quasi-prepolymers of the general formula:

or of the general formula:

where m is equal to 2 or 3 R' is hydrogen or an aliphatic radical, and R is an aliphatic polyether and mixtures thereof and an amine-terminated compound having at least two reactive amine groups.

21. A cap as in claim 20, wherein the amine-terminated compound is selected from the group consisting of amine-terminated compounds of the general formula:

where each R" is independently hydrogen or a methyl radical and the average value of x is in the range of about 2–105, and amine-terminated compounds of the general formula:

where R" is hydrogen or a methyl radical and a, b and c are independently in the range of about 0 to 100 and the average molecular weight of the compound is in the range of about 260–6,000, and mixtures thereof.

22. A method for sealing a surface of a landfill, said method comprising the steps of:

disposing a porous membrane which has been pre-coated with an elastomeric layer upon said surface;

coating at least a portion of said pre-coated porous membrane with a liquid, fast-curing elastomeric material, wherein the fast-curing elastomeric material is prepared by rapidly mixing and initiating the reaction of an isocyanate-terminated compound having at least two reactive isocyanate groups and a compound including at least two active hydrogen immediately before applying the fast-curing elastomeric material to the layer; and allowing the fast-curing elastomeric material to cure, whereby a monolithic, continuous, elastomeric coating is formed on the layer.

23. A method for sealing waste in a landfill comprising the steps of:

disposing a porous membrane atop a body of waste retained in said landfill, wherein said porous membrane is selected from the group consisting of sheets of non-woven polypropylene fabric, paper-based materials, burlap, fiberglass and open weave cloth;

applying a liquid, fast-curing elastomeric material to said porous membrane, wherein the fast-curing elastomeric material is prepared by rapidly mixing and initiating the reaction of an isocyanate-terminated compound having at least two reactive isocyanate groups and a compound including at least two active hydrogen immediately before applying the fast-curing elastomeric material to the porous membrane;

allowing the fast-curing elastomeric material to cure, whereby a monolithic, continuous, elastomeric coating is formed on the porous membrane; and covering said elastomeric coating with soil.

24. A method as in claim 23, wherein the method includes an intermediate step of disposing a low hydraulic conductivity fill layer over the body of waste prior to disposing the porous membrane.

25. A method as in claim 23, wherein the step of initiating the reaction of the isocyanate-terminated compound comprises the step of initiating said reaction between said isocyanate-terminated compound and either an amine-terminated compound having at least two reactive amine groups or a compound including at least two reactive hydroxal groups.

26. A method as in claim 23, wherein the step of initiating the reaction of the isocyanate-terminated compound comprises the step of initiating said reaction between said isocyanate-terminated compound and either an amine-terminated compound having at least two reactive amine groups or a compound including at least two reactive hydroxal groups.

27. A method for sealing waste in a landfill comprising the steps of:

disposing a porous membrane on a body of waste retained in said landfill;

applying a liquid, fast-curing elastomeric material to said porous membrane, wherein the fast-curing elastomeric material is prepared by rapidly mixing and initiating the reaction of an isocyanate-terminated compound having at least two reactive isocyanate groups and a compound including at least two active hydrogen immediately before applying the fast-curing elastomeric material to the porous membrane, said porous membrane having a color different from the color of the fast-curing elastomeric material, wherein said elastomeric material is applied in an amount sufficient to completely mask the color of the porous membrane;

allowing the fast-curing elastomeric material to cure, whereby a monolithic, continuous, elastomeric coating is formed on the porous membrane; and covering said elastomeric coating with soil.

28. A method for sealing waste in a landfill comprising the steps of:

disposing a fill layer atop a body of waste retained in said landfill;

applying a liquid, fast-curing elastomeric material to said fill layer, wherein the fast-curing elastomeric material is prepared by rapidly mixing, and initiating the reaction of, an isocyanate-terminated compound having at least two reactive isocyanate groups and a compound including at least two active hydrogens immediately before applying the fast-curing elastomeric material to the fill layer; and allowing the fast-curing elastomeric material to cure, whereby a monolithic, continuous, elastomeric coating is formed on the fill layer;

wherein said isocyanate-terminated compound is selected from the group consisting of monomeric and polymeric methylene diphenyl diisocyanates of the general formula:

where n is an integer from about 0 to about 10, and mixtures thereof; and quasi-prepolymers of the general formula:

or of the general formula:

where m is equal to 2 or 3, R' is hydrogen or an aliphatic radical, and R is an aliphatic polyether, and mixtures thereof and an amine-terminated compound having at least two reactive amine groups.

29. A method as in claim 28, wherein the step of initiating the reaction of the isocyanate-terminated compound comprises the step of initiating said reaction between said isocyanate-terminated compound and an amine-terminated compound having at least two reactive amine groups.

30. A method as in claim 29, wherein the amine-terminated compound is of the general formula:

where each R" is independently hydrogen or a methyl radical and the average value of x is in the range of about 2–105.

31. A method as in claim 29, wherein the amine-terminated compound is of the general formula:

where R" is hydrogen or a methyl radical and a, b and c are independently in the range of about 0 to 100 and the average molecular weight of the compound is in the range of about 260–6,000.

32. A method for sealing a surface of a landfill, said method comprising the steps of:

rolling out a strip of a porous membrane onto said surface, coating said porous membrane with a fast-curing elastomeric material and allowing said fast-curing elastomeric material to cure so as to provide an elastomeric layer upon said surface;

coating said cured elastomeric layer with said fast-curing elastomeric material, wherein the fast-curing elastomeric material is prepared by rapidly mixing and initiating the reaction of an isocyanate-terminated compound having at least two reactive isocyanate groups and a compound including at least two active hydrogen immediately before applying the fast-curing elastomeric material to the layer; and allowing the fast-curing elastomeric material to cure, whereby a monolithic, continuous, elastomeric coating is formed on the layer.

33. A method of sealing waste in a landfill comprising the steps of:

disposing a fill layer over a body of waste retained in said landfill; laying a porous membrane sheet over said fill layer substantially fully covering said fill layer;

spraying a liquid, fast-curing elastomeric material over said porous membrane sheet, fully covering said porous membrane sheet and forming a continuous, monolithic, elastomeric coating over said sheet, wherein the fast-curing elastomeric material is prepared by rapidly mixing and initiating the reaction of an isocyanate-terminated compound having at least two reactive isocyanate groups and a compound including at least two active hydrogens immediately before spraying the fast-curing elastomeric material; and allowing the fast-curing elastomeric material to cure, forming said continuous, monolithic, elastomeric coating over said sheet.

34. A method as in claim 33, wherein the method includes disposing a porous membrane selected from the group consisting of sheets of non-woven polypropylene fabric, paper-based materials, burlap, fiberglass and open weave cloth.

35. A method as in claim 33, wherein the method includes disposing a low hydraulic conductivity fill layer over said body of waste.

36. A method as in claim 33, wherein said porous membrane is of a color different from the color of the fast-curing elastomeric material and wherein the step of applying the fast-curing elastomeric material to the fill layer comprises applying said elastomeric material in an amount sufficient to completely mask the color of the porous membrane.

37. A method as in claim 33, wherein the step of initiating the reaction of the isocyanate-terminated compound comprises the step of initiating said reaction between said isocyanate-terminated compound and either an amine-terminated compound having at least two reactive amine groups or a compound including at least two reactive hydroxyl groups.

38. A method as in claim 37, wherein said isocyanate-terminated compound is a monomeric or a polymeric methylene diphenyl diisocyanate or a mixture of monomeric or polymeric methylene diphenyl diisocyanates of the general formula:

where n is an integer from about 0 to about 10.

39. A method as in claim 37, wherein the isocyanate-terminated compound is a quasi-prepolymer or a mixture of quasi-prepolymers of the general formula:

or of the general formula:

where m is equal to 2 or 3, R' is hydrogen or an aliphatic radical, and R is an aliphatic polyether.

* * * * *

UNITED STATES PATENT AND TRADEMARK OFFICE
CERTIFICATE OF CORRECTION

PATENT NO.  : 5,562,586
DATED       : October 8, 1996
INVENTOR(S) : Peter K. Hyde-Smith, Mayville, Mich.

It is certified that error appears in the above-indentified patent and that said Letters Patent is hereby corrected as shown below:

On the Title page, please correct

Item [75] Inventor(s): Peter K. Hyde-Smith, Mayville, Mich.;
                       Edith M. Grashik, Lake Orion, Mich.

Signed and Sealed this

Tenth Day of June, 1997

Attest:

BRUCE LEHMAN

Attesting Officer

Commissioner of Patents and Trademarks